United States Patent
Hegemann et al.

(10) Patent No.: US 10,148,917 B2
(45) Date of Patent: Dec. 4, 2018

(54) METHOD AND DEVICE FOR RECOGNIZING MARKED HAZARD AREAS AND/OR CONSTRUCTION AREAS IN THE REGION OF LANES

(71) Applicants: Conti Temic microelectronic GmbH, Nuremberg (DE); Continental Teves AG & Co. oHG, Frankfurt (DE)

(72) Inventors: Stefan Hegemann, Wangen (DE); Matthias Komar, Frankfurt am Main (DE); Stefan Lueke, Bad Homburg (DE)

(73) Assignees: Conti Temic microelectronics GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 288 days.

(21) Appl. No.: 14/417,931

(22) PCT Filed: Jul. 10, 2013

(86) PCT No.: PCT/DE2013/200034
§ 371 (c)(1),
(2) Date: Jan. 28, 2015

(87) PCT Pub. No.: WO2014/063688
PCT Pub. Date: May 1, 2014

(65) Prior Publication Data
US 2015/0189244 A1    Jul. 2, 2015

(30) Foreign Application Priority Data
Oct. 25, 2012    (DE) .................. 10 2012 110 219

(51) Int. Cl.
*G01C 22/00*    (2006.01)
*G05D 1/00*    (2006.01)
(Continued)

(52) U.S. Cl.
CPC ............. *H04N 7/183* (2013.01); *B60R 1/005* (2013.01); *G01C 21/3691* (2013.01);
(Continued)

(58) Field of Classification Search
CPC .... G01C 21/32; G01C 21/26; G06F 17/30241
See application file for complete search history.

(56) References Cited

U.S. PATENT DOCUMENTS 8,527,199 B1 * 9/2013 Burnette ................ G01C 21/32
  701/23
8,620,032 B2   12/2013 Zeng
(Continued)

FOREIGN PATENT DOCUMENTS

DE    102004003848    8/2005
DE    102008020447    3/2009
(Continued)

OTHER PUBLICATIONS

International Search Report of the International Searching Authority for International Application PCT/DE2013/200034, dated Oct. 25, 2013, 2 pages, European Patent Office, HV Rijswijk, Netherlands.
(Continued)

*Primary Examiner* — Rebecca A Volentine
(74) *Attorney, Agent, or Firm* — W. F. Fasse

(57) ABSTRACT

In order to recognize hazard areas and/or construction areas on a roadway, an environment sensor produces detected environment data regarding objects indicating the hazard areas and/or construction areas. A traffic light system is detected in the environment data, position data of the traffic light system is determined, an environment scenario is determined from the environment data and is compared with a reference model of the environment scenario. If the reference model does not indicate the presence of a traffic light system, or indicates a traffic light system having
(Continued)

position data differing from the position data of the detected traffic light system, then it is concluded that the detected traffic light system is a traffic light system identifying a hazard and/or construction area.

19 Claims, 2 Drawing Sheets

(51) Int. Cl.
   *G06K 9/00* (2006.01)
   *H04N 7/18* (2006.01)
   *G01C 21/36* (2006.01)
   *B60R 1/00* (2006.01)
   *G01S 13/93* (2006.01)
   *G08G 1/16* (2006.01)
   *G01S 13/86* (2006.01)

(52) U.S. Cl.
   CPC . *B60R 2300/302* (2013.01); *B60R 2300/8093* (2013.01); *G01S 13/867* (2013.01); *G01S 13/931* (2013.01); *G08G 1/161* (2013.01)

(56) References Cited

U.S. PATENT DOCUMENTS

| | | | |
|---|---|---|---|
| 2003/0125871 A1 | 7/2003 | Cherveny et al. | |
| 2005/0283699 A1 | 12/2005 | Nomura et al. | |
| 2007/0047809 A1* | 3/2007 | Sasaki | G06K 9/00791 382/170 |
| 2009/0169055 A1* | 7/2009 | Ishikawa | G01C 21/32 382/104 |
| 2009/0303077 A1* | 12/2009 | Onome | G08G 1/096716 340/901 |
| 2010/0033571 A1* | 2/2010 | Fujita | B60W 40/02 348/149 |
| 2010/0207751 A1* | 8/2010 | Follmer | G01C 21/3697 340/439 |
| 2011/0095908 A1* | 4/2011 | Nadeem | B60H 3/00 340/905 |
| 2013/0211682 A1* | 8/2013 | Joshi | G08G 1/0967 701/70 |
| 2013/0253754 A1* | 9/2013 | Ferguson | G05D 1/0231 701/28 |
| 2014/0063232 A1* | 3/2014 | Fairfield | G06K 9/78 348/118 |
| 2014/0067187 A1* | 3/2014 | Ferguson | B60W 30/00 701/28 |

FOREIGN PATENT DOCUMENTS

| | | |
|---|---|---|
| DE | 102012207620 | 12/2012 |
| JP | 2009-128356 A | 6/2009 |

OTHER PUBLICATIONS

PCT International Preliminary Report on Patentability including English Translation of PCT Written Opinion of the International Searching Authority for International Application PCT/DE2013/200034, dated Apr. 28, 2015, 8 pages, International Bureau of WIPO, Geneva, Switzerland.

German Search Report for German Patent Application No. 10 2012 110 219.8, dated Dec. 14, 2012, 5 pages, Muenchen, Germany, with English translation, 5 pages.

* cited by examiner

METHOD AND DEVICE FOR RECOGNIZING MARKED HAZARD AREAS AND/OR CONSTRUCTION AREAS IN THE REGION OF LANES

FIELD OF THE INVENTION

The invention relates to a method, a device and a vehicle equipped for recognizing marked hazard areas and/or construction areas on a roadway.

BACKGROUND INFORMATION

Such a method is known from the generic DE 10 2004 003 848 A1, wherein spatial separation images of a detection area of a sensor for electromagnetic radiation, in particular a laser scanner, mounted on a vehicle are used to recognize marked hazard areas and/or construction areas in the region of lanes, such that these spatial separation images look for indicators of marked hazard and/or construction areas. Known methods of object detection and/or tracking are used to recognize such indicators of marked hazard and/or construction areas. These indicators can be specified by the relevant standards of the highways authority and/or statutory requirements, for example the Straßenverkehrsordnung [road traffic regulations] in Germany and can, for example, constitute markings on a lane, barriers, pylons or beacons, wherein the latter objects are generally only erected to indicate temporary changes in lane running.

SUMMARY OF THE INVENTION

Starting from this prior art, it is an object of one or more embodiments of the invention to provide a method of the general type indicated above which makes possible improved detection of construction area situations, both in urban and rural environment scenarios.

This object can be achieved by an embodiment of a method having features as disclosed herein.

Such a method for recognizing marked hazard areas and/or construction areas in the region of lanes, in which method by means of at least one environment sensor the objects indicating hazard areas and/or construction areas are detected, is characterized according to the invention in that a traffic light system is detected by means of the environment sensor, the positional data of the traffic light system is determined, an environment scenario in respect of the environment structure is determined from the environment data detected by the environment sensor and is compared with a reference model of the environment scenario, and if said reference model indicates no traffic light system or indicates a traffic light system having positional data differing from the positional data of the detected traffic light system, a conclusion is drawn about a traffic light system identifying a hazard and/or a construction area.

This invention starts from the knowledge that the position of a traffic light system (designated an optical or light signaling system in the German guidelines) can be used as an indicator of a hazard area and/or of a construction area, if the position thereof in the detected and evaluated environment scenario differs from an expected position of a traffic light system in such an environment scenario.

Traffic light systems are used, on the one hand, in a stationary condition at crossroads and junctions at particular positions and, on the other hand, as mobile installations at bottlenecks such as, for example, construction areas. The positions of traffic light systems for an environment structure with, for example, a crossroads or a junction, are known, i.e. are shown in the reference model of the environment scenario. The position of an expected traffic light system can therefore be determined using the detected environment structure, for example a crossroads, from the reference model and this position can be compared with a traffic light system actually detected. If this positional data differs, it can be assumed with a high probability that the detected traffic light system is a construction area traffic light system or a traffic light system indicating a hazard area. Also, if the reference model indicates no traffic light system, it can be assumed with a high probability that the detected traffic light system is a construction area traffic light system or a traffic light system indicating a hazard area.

In one configuration of the invention the reference model is created by means of navigation-based information. Since a navigation system is, as a rule, already provided in today's vehicles, the method according to the invention can be realized inexpensively.

In order to improve the reliability of detection, according to a further configuration of the invention, object classification in respect of construction area-specific and/or hazard area-specific features of the traffic light system is carried out, in order to recognize a traffic light system identifying a hazard and/or a construction area. As such traffic light systems are erected as mobile installations, they must be equipped with their own power supply, therefore with a battery or a photovoltaic panel, for example. A battery is generally housed in a battery housing located in the area of the base of the traffic lights, the photovoltaic panel is generally arranged above the signaling lights in the form of a roof. These features which relate to the power supply of the traffic light system can therefore be classified as construction area-specific and/or hazard area-specific features of a traffic light system, and can be detected by means of object detection software.

In addition, in accordance with another advantageous configuration or embodiment of the invention, the reference model is generated from digital map data of a network of transport routes stored in a navigation database, wherein the digital map data comprises construction area information. Such map data can already be stored in an infotainment system of the vehicle or can also be transferred to the vehicle via online services by means of a communication link. This guarantees a particularly high reliability of detection.

A further improvement of the reliability of detection in respect of a hazard area and/or a construction area can be achieved by amalgamating different detection systems provided in the vehicle, in that according to one configuration of the invention the information detected by means of the environment sensor regarding the running of the lane and/or the lane information detected is used as an indicator of the existence of a traffic light system identifying a hazard and/or a construction area. Alternatively or additionally, the information detected by means of the environment sensor regarding detected road signs can also be used as an indication of such a traffic light system.

An embodiment of a device for carrying out the method according to the invention comprises a camera system as the environment sensor, as well as the associated hardware such as, for example, evaluation and object detection systems.

Such a device is suitable for use in a vehicle such as, for example, a motor vehicle, hybrid vehicle or electric vehicle.

BRIEF DESCRIPTION OF THE DRAWING

The invention will be explained in more detail below with reference to the accompanying drawings, wherein FIG. 1 schematically shows a vehicle equipped with a device or system according to an example embodiment of the invention.

DETAILED DESCRIPTION OF A PREFERRED EXAMPLE EMBODIMENT OF THE INVENTION

Figure 1:
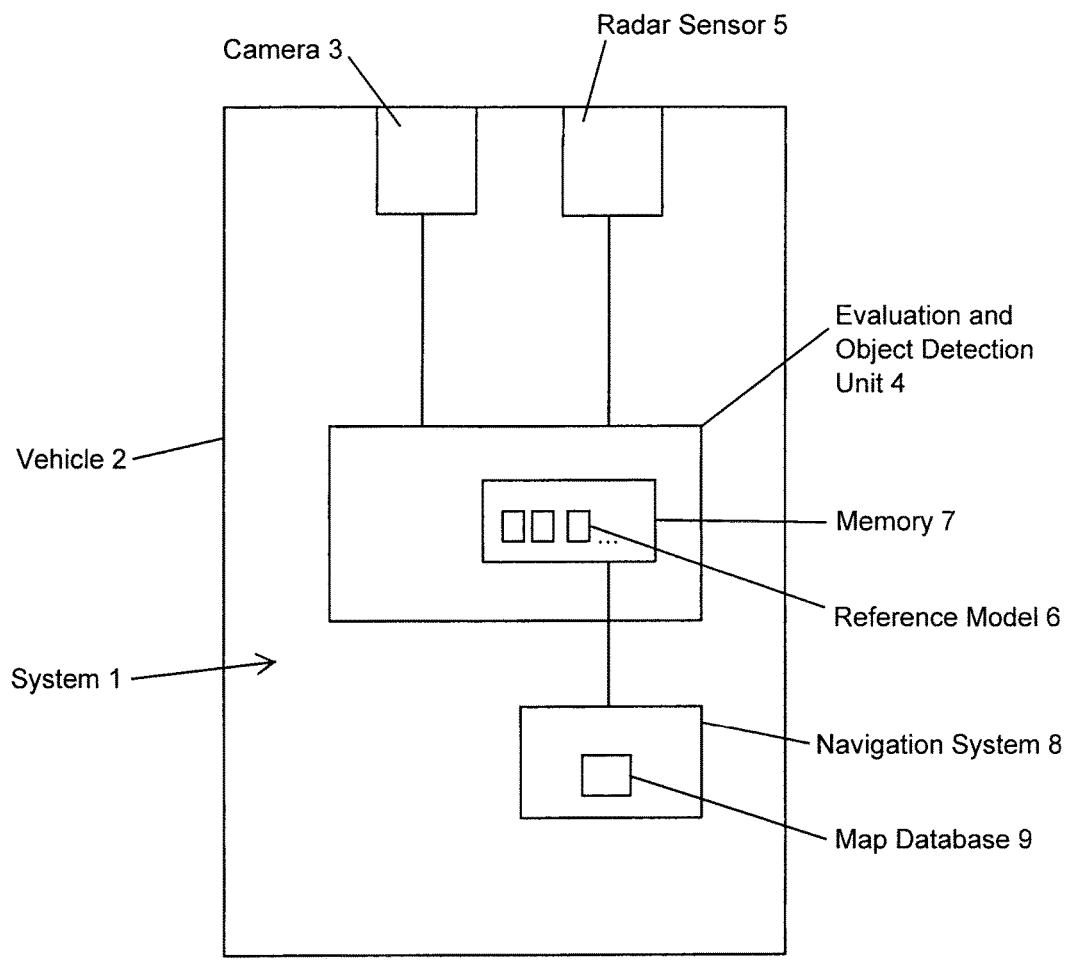
Figure 2:
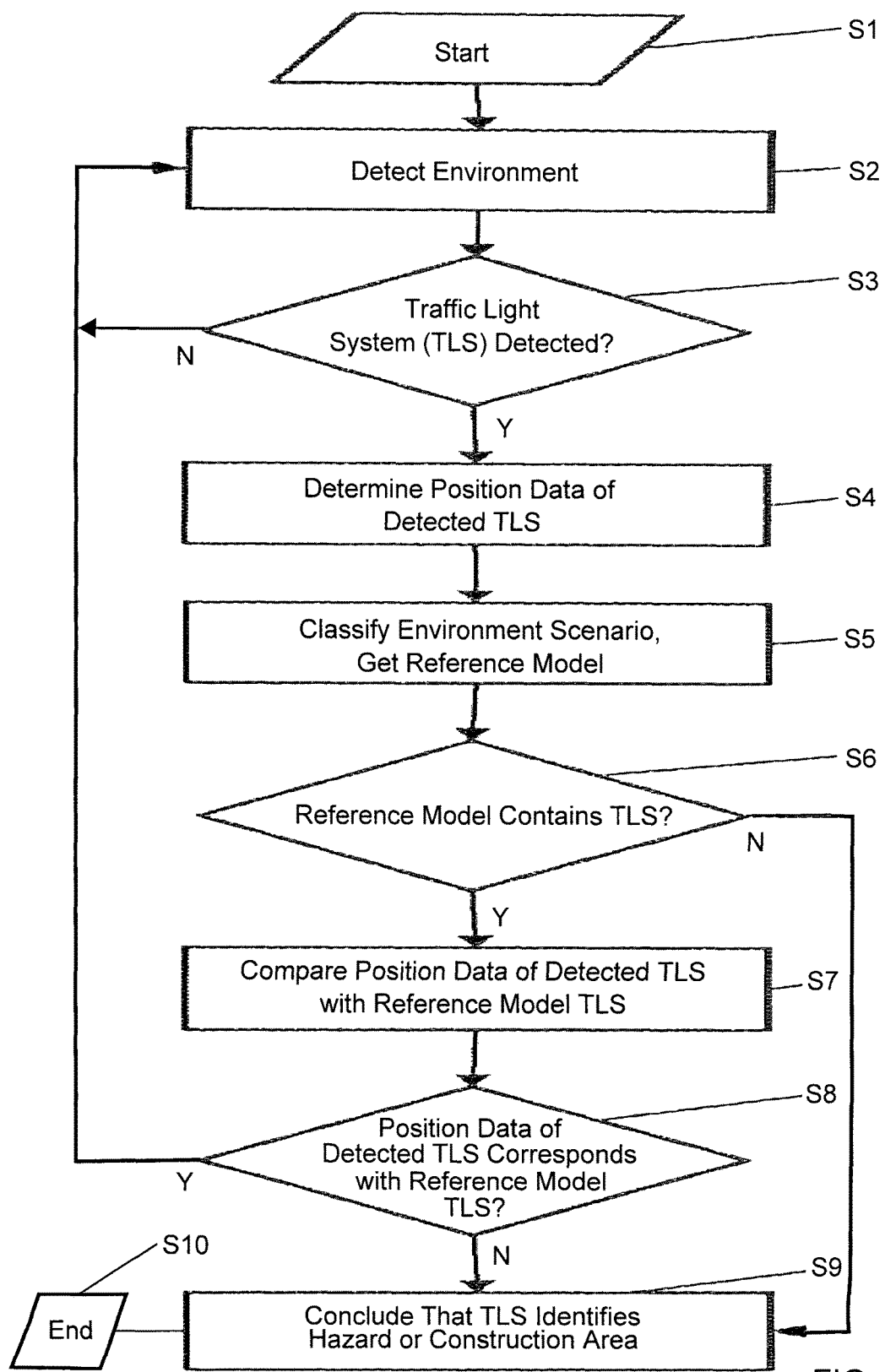
FIG. 2 shows a flowchart of an example embodiment of a method according to the invention.

The method for recognizing marked hazard and/or construction areas in the region of lanes, which is shown as an example embodiment in FIG. 2 can be carried out by an example embodiment of a device or system 1 installed in a vehicle 2 as shown in FIG. 1. The system 1 comprises either a monocamera or stereo camera 3 as the environment sensor, the sensor signals of which are fed to an evaluation and object detection unit 4 for evaluation. In addition, further environment sensors such as, for example, a radar sensor 5 can also be used.

Following start-up (method step S1 in FIG. 2) the vehicle environment, i.e. the environment located in the detection area of the environment sensor, is detected and evaluated by means of the environment sensor according to a method step S2. If, according to a subsequent method step S3, a traffic light system is detected, the positional data thereof is determined in an additional method step S4; otherwise, if no traffic light system is detected, the system jumps back to method step S2.

The environment scenario is classified and a reference model is determined in an additional method step S5. The environment scenario detected by the environment sensor is classified in respect of the environment structure, i.e. whether there is a crossroads or a junction, for example, or whether a continuing section of the road or section of the lane has simply been detected. According to this classification of the environment scenario, a reference model 6 which shows this environment scenario is determined and/or selected. Appropriate reference models 6 can, for example, be stored in a memory 7 of the evaluation and object detection unit 4.

Such reference models 6 can be created by means of navigation-based information, wherein this information originates, for example, from a navigation system 8 of the vehicle. Furthermore, it is also possible to generate the reference model from digital map data of a network of transport routes stored in a navigation map database 9, wherein the digital map data comprises construction area information. Such map data can already be stored in an infotainment system of the vehicle or can also be transferred to the vehicle via online services by means of a wireless communication link.

Method step S6 examines whether the reference model indicates the presence of a traffic light system. If the reference model determined according to method step S5 then indicates no traffic light system, it can be assumed with high probability that the traffic light system detected in the environmental sensor data with method step S3 is a construction area traffic light system or a traffic light system indicating a hazard area according to method step S9. The method is terminated with the subsequent method step S10 or the system jumps back to method step S2.

In the other case, if the reference model indicates a traffic light system, the positional data of the traffic light system from the reference model is compared, in a subsequent method step S7, with the positional data of the traffic light system detected in method step S3.

If, in an additional, subsequent method step S8, a correspondence is established, it is assumed that a traffic light system appropriate to the environment structure exists, therefore for example traffic lights at a crossroads, and that no construction area traffic light system or traffic light system indicating a hazard area exists. The system therefore jumps back to method step S2.

If, on the other hand, no correspondence of the positional data is established, this means that the traffic light system detected with method step S3 does not constitute a traffic light system appropriate to the environment structure and therefore a construction area traffic light system or a traffic light system indicating a hazard area is in all likelihood to be assumed according to method step S9. The method is terminated with the subsequent method step S10 or the system jumps back to method step S2.

This described method can be improved to the extent that, in order to recognize a traffic light system indicating a hazard area and/or a construction area, object classification in respect of construction area-specific and/or hazard area-specific features of the traffic light system is carried out. As such traffic light systems are erected as mobile installations, they must be equipped with their own power supply, therefore with a battery or a photovoltaic panel, for example. A battery is generally housed in a battery housing located in the area of the base of the traffic light, the photovoltaic panel is generally arranged above the signaling lights in the form of a roof. These features which relate to the power supply of the traffic light system can therefore be classified as construction area-specific and/or hazard area-specific features of a traffic light system, and can be detected by means of object detection software.

A further improvement of the described method in order to improve the reliability of detection in respect of detecting a hazard area and/or a construction area can be achieved by amalgamating different detection systems provided in the vehicle, in that the information detected by means of the environment sensor regarding the running of the lane and/or the lane information detected is used as an indicator of the existence of a traffic light system identifying a hazard and/or a construction area. The lane information can, for example, comprise the color of the lane marking. Alternatively or additionally, the information detected by means of the environment sensor regarding detected road signs can also be used as an indicator of the existence of a traffic light system identifying a hazard and/or a construction area.

The invention claimed is:

1. A method of recognizing a road hazard area or a road construction area on a roadway along which a vehicle is driving, comprising the steps:
   detecting an actual traffic light system along the roadway, from environment data produced by at least one environment sensor of the vehicle,
   determining actual positional data of the actual traffic light system, from the environment data,
   determining an environment scenario by classifying an environment configuration represented by features detected in the environment data,
   determining a reference model pertaining to the environment scenario, wherein the reference model indicates whether an expected traffic light system exists in the reference model, and when the expected traffic light system does exist in the reference model then the reference model provides reference positional data regarding an expected position of the expected traffic light system, and when the reference model does not include the expected traffic light system or indicates that the reference positional data of the expected traffic light system differs from the actual positional data of the actual traffic light system, then based at least thereon as a prerequisite, concluding that the actual traffic light system is a temporary traffic light system located at and identifying a road hazard area or a road construction area.

2. The method according to claim 1, wherein the step of determining the reference model comprises creating the reference model from navigation-based information.

3. The method according to claim 1, further comprising performing an object classification of the environment data regarding construction area-specific or hazard area-specific features of the actual traffic light system, to provide additional information as a further prerequisite for concluding that the actual traffic light system is the temporary traffic light system located at and identifying the road hazard area or the road construction area.

4. The method according to claim 1, wherein the step of determining the reference model comprises generating the reference model from digital map data of a network of transport routes stored in a navigation database, wherein the digital map data comprise construction area information.

5. The method according to claim 1, further comprising additionally using information in the environment data regarding a course of a lane on the roadway or recognized lane information as a further prerequisite for concluding that the actual traffic light system is the temporary traffic light system located at and identifying the road hazard area or the road construction area.

6. The method according to claim 1, further comprising additionally using information in the environment data regarding recognized road signs on the roadway as a further prerequisite for concluding that the actual traffic light system is the temporary traffic light system located at and identifying the road hazard area or the road construction area.

7. A device for carrying out the method according to claim 1, comprising
said environment sensor, which comprises a camera system, configured and arranged to detect the actual traffic light system on the roadway, and
hardware that is connected to said camera system,
wherein said hardware comprises a memory which stores the reference model pertaining to the environment scenario, and
wherein said hardware further comprises an object detection and evaluation unit which is configured to determine the actual positional data of the actual traffic light system, to determine the environment scenario from the environment data, and to generate the conclusion about the detected traffic light system.

8. The device according to claim 7, further comprising object detection software that can be executed by said object detection and evaluation unit to recognize whether the actual traffic light system includes a battery housing or a photovoltaic panel.

9. The device according to claim 7, further comprising a vehicle navigation system producing navigation based information from which the reference model is generated.

10. The device according to claim 7, further comprising a digital map database including construction area information from which the reference model is generated.

11. A vehicle system comprising the device according to claim 7, and a motor vehicle, a hybrid vehicle or an electric vehicle on which the device is mounted.

12. A method of automatically recognizing a road hazard area or a road construction area on a roadway along which a vehicle is driving, comprising steps:
a) with at least one environment sensor of the vehicle, producing environment data regarding an environment on the roadway;
b) evaluating the environment data to detect an actual traffic light system on the roadway;
c) evaluating the environment data to determine actual position data of a position of the actual traffic light system;
d) from the environment data determining an environment scenario by classifying an environment configuration represented by features of the environment;
e) determining or obtaining a reference model that represents previously acquired reference information pertaining to the environment scenario, wherein the reference information indicates whether an expected traffic light system exists in the reference model and provides reference position data regarding an expected position of the expected traffic light system when the expected traffic light system exists in the reference model;
f) when the reference information does not indicate that the expected traffic light system exists in the reference model, then in response thereto as a prerequisite, generating a conclusion that the actual traffic light system is a temporary traffic light system identifying the road hazard area or the road construction area on the roadway; and
g) when the reference information indicates that the expected traffic light system exists in the reference model, then comparing the reference position data with the actual position data, and when the reference position data differs from the actual position data then in response thereto as a prerequisite, generating the conclusion that the actual traffic light system is the temporary traffic light system identifying the road hazard area or the road construction area on the roadway.

13. The method according to claim 12, further comprising a step:
h) when the reference information indicates that the expected traffic light system exists in the reference model, then comparing the reference position data with the actual position data, and when the reference position data corresponds to the actual position data then in response thereto generating a conclusion that the actual traffic light system is not a hazard or construction light system identifying the road hazard area or the road construction area on the roadway but instead is a normal permanent traffic light system of the roadway.

14. The method according to claim 12, wherein said steps f) and g) further comprise performing object detection on the environment data and therein detecting a battery housing or a photovoltaic panel on the actual traffic light system as another prerequisite for generating the conclusion that the actual traffic light system is the temporary traffic light system identifying the road hazard area or the road construction area on the roadway.

15. The method according to claim 12, wherein the actual position data identifies the position of the actual traffic light system with respect to and relative to other features of the roadway detected in the environment data, and the reference position data identifies the expected position of the expected traffic light system with respect to and relative to other features in the reference model.

16. The method according to claim 1, further comprising a step:

when the reference model indicates that the expected traffic light system exists in the reference model, and that the reference positional data of the expected traffic light system corresponds to the actual positional data of the actual traffic light system, then based thereon, concluding that the actual traffic light system is not a temporary traffic light system located at and identifying the road hazard area or the road construction area but instead is a normal permanent traffic light system of the roadway.

17. The method according to claim 1, further comprising performing object detection on the environment data and therein detecting a battery housing or a photovoltaic panel on the actual traffic light system as another prerequisite for concluding that the actual traffic light system is the temporary traffic light system located at and identifying the road hazard area or the road construction area.

18. The method according to claim 1, wherein the actual positional data identifies an actual position of the actual traffic light system with respect to and relative to other features of the roadway detected in the environment data, and the reference positional data identifies the expected position of the expected traffic light system with respect to and relative to other features in the reference model.

19. The method according to claim 12, wherein the step e) of determining or obtaining the reference model comprises selecting the reference model that pertains to the environment scenario from among a plurality of different reference models previously stored in a memory.

\* \* \* \* \*